United States Patent [19]

Gerner

[11] Patent Number: 4,799,108
[45] Date of Patent: Jan. 17, 1989

[54] METHOD OF RECORDING AND STORING IMAGES IN RAPID SEQUENCE

[75] Inventor: Rudolf Gerner, Berlin, Fed. Rep. of Germany

[73] Assignee: KAPPA messtechnik GmbH, Gleichen-Reinhausen, Fed. Rep. of Germany

[21] Appl. No.: 86,965

[22] Filed: Aug. 19, 1987

[30] Foreign Application Priority Data

Aug. 19, 1986 [DE] Fed. Rep. of Germany ....... 3628147

[51] Int. Cl.⁴ .............................................. H04M 3/14
[52] U.S. Cl. ............................ 358/213.26; 358/213.25
[58] Field of Search ...................... 358/213.26, 213.25, 358/213.11, 213.27, 213.23, 909

[56] References Cited

U.S. PATENT DOCUMENTS

| | | | |
|---|---|---|---|
| 3,777,061 | 12/1973 | Takemura | 358/213.25 |
| 4,280,141 | 7/1981 | McCann et al. | 358/213.26 |
| 4,573,078 | 2/1986 | Rentsch et al. | 358/213.26 |
| 4,598,321 | 7/1986 | Elabd et al. | 358/213.26 |
| 4,614,966 | 9/1986 | Yunoki et al. | 358/909 |

*Primary Examiner*—Jin F. Ng
*Assistant Examiner*—Stephen Brinich
*Attorney, Agent, or Firm*—Max Fogiel

[57] ABSTRACT

A method of recording and storing pictures in rapid sequence wherein the pictures are imaged by means of an optical system on the recording surface of a CCD picture recorder that operates on the frame-transfer principle are transferred in the form of charge pictures into the memory of the CCD picture recorder, and are read out line by line by means of a register. The object is to increase the picture-repetition frequency. The surface of a CCD picture recorder (1) that consists of the recording area and the memory area is subdivided into an accordingly smaller subsidiary recording area (2) and at least two subsidiary memory areas (3, 4, & 5) and in that one picture (9) is transferred in separate steps from the subsidiary recording area (2) through the subsidiary memory areas (3, 4, & 5) in sequence and every subsequent picture (10, 11, & 12) is imaged in the subsidiary recording area (2) as it becomes free and is transferred in separate steps to each subsidiary memory area (3, 4, & 5) as it becomes free until all the subsidiary areas (2, 3, 4, & 5) of the CCD picture recorder (1) are completely charged.

6 Claims, 2 Drawing Sheets

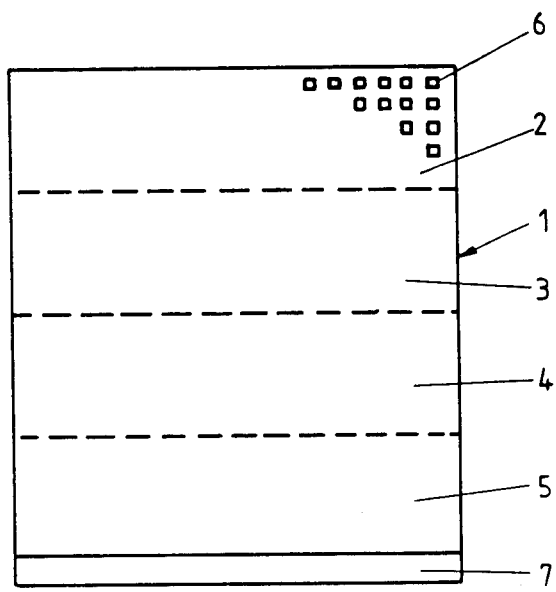
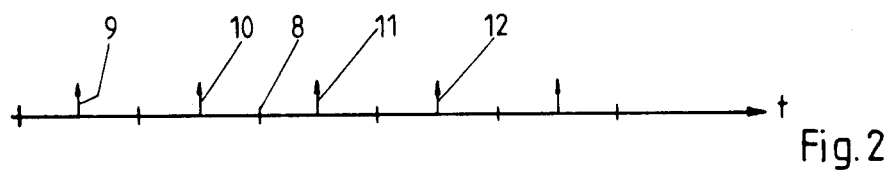
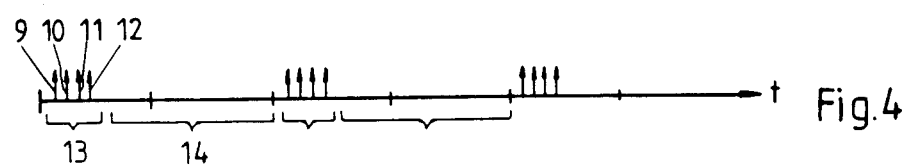

METHOD OF RECORDING AND STORING IMAGES IN RAPID SEQUENCE

The invention concerns a method of recording and storing pictures in rapid sequence wherein the pictures are imaged by means of an optical system on the recording surface of a CCD picture recorder that operates on the frame-transfer principle, are transferred in the form of charge pictures into the memory of the CCD picture recorder, and are read out line by line by means of a register. The object of the invention is to obtain stored pictures that, although they may occur in rapid sequence, can be observed in slow sequence (slow motion) or otherwise processed.

A method of this type can be carried out with equipment belonging to the field of conventional television technology, with 50 fields per second being recorded in accordance with the European standard and 60 per second in accordance with the United States standard, depending on the particular frequency. The pictures are pictured by means of an optical system on a CCD picture recorder. The recorder is divided into a recording area and a memory area. Charges that depend on the intensity levels of the picture are generated and processed in the recording area. The charges are transferred to the memory area. Downstream of the memory area is a register, in which the various charges are read out line by line.

The conventional television picture-repetition frequency, however, is inadequate for many industrial applications, and attempts have been made to increase it in order to improve the time resolution. The problem encountered in normal television technology is that on the one hand more rapid read-out leads t essentially higher signal frequencies and on the other that normal equipment cannot be employed for standard recording.

Reading a picture out more rapidly at the camera end when working against the standard at a frequency of 50 Hz is known from television and video technology. Using a pulse generator at a frequency of 100 or 200 Hz, for example, makes it possible to attain twice or four times the picture-repetition frequency. When several pictures are processed in parallel, when, that is, several lines are read out simultaneously, a picture-repetition frequency of up to 10,000 pictures a second has been attained, at the expense of 24 parallel-operating video recorders of course. The equipment expenditure is in this case considerable, and is accompanied by the drawback that continuous operation is impossible and that information gaps must necessarily be taken into the bargain.

High-speed photography is also concerned with recording and storing pictures in rapid sequence for the purpose of slow-motion observation. Rotating prisms, cameras, rotating drums, etc. are employed such that it is eventually possible to resolve a picture-repetition frequency of $1 \times 10^6$ pictures a second mechanically with this equipment. When electronic aids are also employed, the picture-repetition frequency will be increased by another factor of 10, although with few pictures in one sequence, 10 for instance, and at a resolution that is much lower than that typical of photography. The electronic aids have previously involved projecting a picture on a photocathode that is then displayed on a phosphorescent screen by means of an image-amplifying optical system. Finally, the electronic-optical display can be varied to transfer the picture to the screen in a rapid sequence on the order of submicroseconds, resulting in time resolution.

The object of the invention is to improve a method of the aforesaid type to the extent that a higher picture-repetition frequency can be attained with equipment of the essentially known technology in order to allow more extended slow-motion display of rapid processes.

This object is attained in accordance with the invention in that the surface of a CCD picture recorder 1 that consists of the recording area and the memory area is subdivided into an accordingly smaller subsidiary recording area 2 and at least two subsidiary memory areas 3, 4, and 5 and in that one picture 9 is transferred in separate steps from subsidiary recording area 2 through subsidiary memory areas 3, 4, and 5 in sequence and every subsequent picture 10, 11, and 12 is imaged in subsidiary recording area 2 as it becomes free and is transferred in separate steps to each subsidiary memory area 3, 4, and 5 as it becomes free until all the subsidiary areas 2, 3, 4, and 5 of CCD picture recorder 1 are completely charged. The method in accordance with the invention divides a known CCD picture recorder up in a different way and then exploits the differently functioning areas in a different way. Whereas previous CCD picture recorders have a recording area and a single memory area of the same size with a downstream line-by-line read-out register, the new method of division is carried out such that there is only a single subsidiary recording area and several subsidiary memory areas. In the simplest type of division the subsidiary recording area extends over 1/3 of the surface of the CCD picture recorder, with two equally large subsidiary memory areas associated with the subsidiary recording area and accordingly accounting for 2/3 of the total area. The next possible division comprises one subsidiary recording area accounting for ¼ of the total area and three subsidiary memory areas associated with it. It is only the latter division that allows the picture-repetition frequency to be doubled, but with the picture only half as large. It is accordingly also possible to reduce the picture format to ¼ and multiply the picture-repetition frequency by four. The charge picture in the subsidiary recording area is then transferred to the first subsidiary memory area, the one adjacent to the subsidiary recording area, leaving the latter ready to record another picture. The first picture stored is then transferred from the first subsidiary memory area to the second and the second picture from the subsidiary recording area to the first subsidiary memory area. The process is repeated step by step with the subsequent pictures until the total surface of the CCD picture recorder is completely charged. The pictures stored in the various subsidiary memory areas are read out conventionally with a read-out register. Since normal television technology can be employed at this point, the pictures can be registered on commercially available video recorders, picture processors, etc. If, on the other hand, non-standard equipment is employed, equipment with a pulse-generator frequency of 100 or 200 Hz for example, the picture-repetition frequency will be further increased by a factor of 2 or 4. Another advantage of the method in accordance with the invention is that no special picture recorders will have to be designed. These complicated and highly-integrated components can, rather, be employed in their standard versions. The chronological intervals between the individual pictures will be evident from the maximum pulse rates of the CCD picture recorder and its controls. The intervals between two pictures are now on the order of 100 microseconds and are accordingly more rapid than in previous high-speed processes.

It is in particular possible to subdivide the recording area of the CCD picture recorder into an accordingly smaller subsidiary recording area and one or more subsidiary memory areas with the memory area of the CCD picture recorder divided into two subsidiary memory areas. This results, with the least possible subdivision, in a subsidiary recording area half the previous size and with three subsidiary memory areas associated with it. This doubles the picture-repetition frequency. In this simplest case of division it also becomes possible to operate continuously, meaning that half-as-large pictures can be continuously recorded and processed at twice the picture-repetition frequency. It is also possible to store and further process by conventional techniques.

The increased picture-repetition frequency and the subdivision of the recording area on the one hand and of the memory area on the other can be carried out at a reciprocal ratio. This also makes it possible to continuously record and process the pictures.

It is on the other hand also possible to divide the sequence of pictures into a sequence with a high picture-repetition frequency and an information gap, with the number of pictures in one picture sequence demarcated by the sum of the number of subsidiary recording and subsidiary memory areas. This makes it possible to operate even discontinuously at a very high picture-repetition frequency and still compile picture groups within one picture sequence, resulting in an information gap that lasts until another picture sequence is recorded on the now read-out CCD picture recorder.

The invention will now be specified with reference to the drawing, wherein

FIG. 1 is a schematic representation of a CCD picture recorder,

FIG. 2 illustrates the previous method of operation over time of a CCD picture recorder, FIG. 3 illustrates the new method of continuous operation over time of a CCD picture recorder, FIG. 4 illustrates the new method of discontinuous operation over time of a CCD picture recorder.

Figure 5:
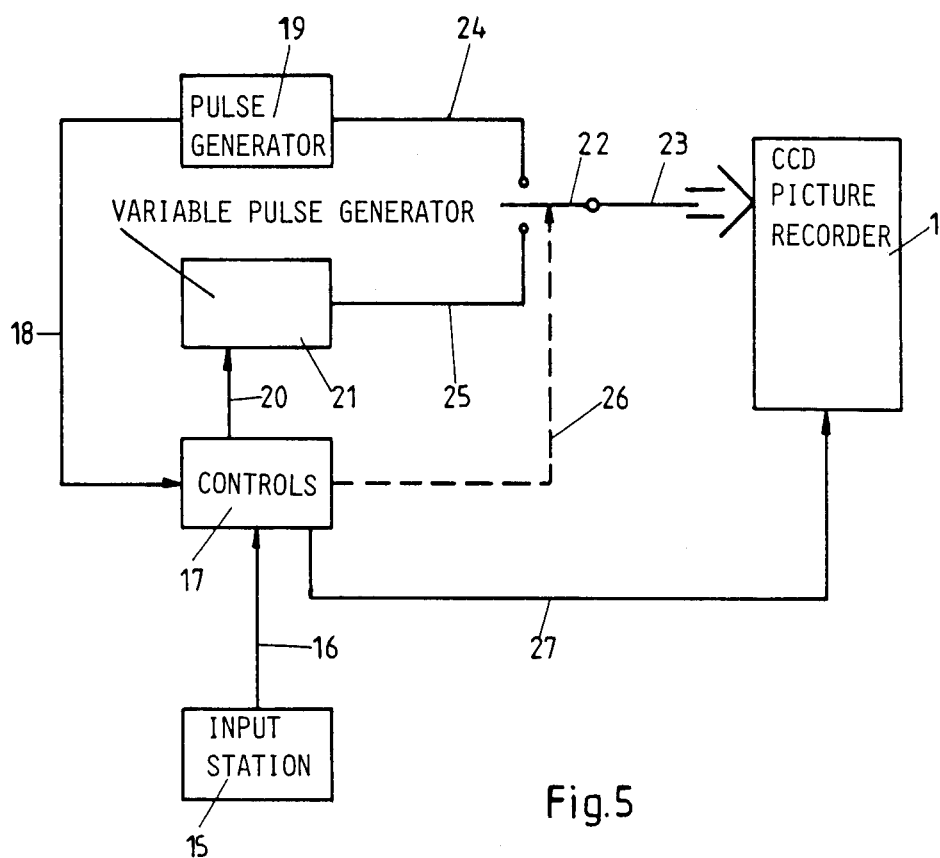
FIG. 5 is a block diagram of the equipment.

Figure is a schematic representation of a CCD picture recorder 1. The active portion of its surface that has previously been utilized as a recording area is subdivided into a subsidiary recording area 2 and a subsidiary memory area 3. The previous memory area is subdivided into a second (4) and third (5) subsidiary memory area. All four areas 2, 3, 4, and 5 are of the same size and have the same recording capacity. Individual charge points 6 are conventionally distributed in rows and columns throughout each area 2, 3, 4, and 5. In contrast to the previous method of utilizing a CCD picture recorder, subsidiary recording area 2 is now available for illumination with pictures, whereas subsidiary memory areas 3, 4, and 5 are employed for storing the transferred charges.

When a picture is recorded, it is projected onto subsidiary recording area 2, establishing corresponding charges in charge points 6. These charges are transferred step by step through subsidiary memory areas 3, 4, and 5. As soon as the charges associated with the first picture in subsidiary recording area 2 have been transferred to subsidiary memory area 3, subsidiary recording area 2 will be available for the second recording or picture. This picture will then also be transferred on in a separate step. The same occurs with the third and fourth picture until areas 2, 3, 4, and 5 are all completely charged. The CCD picture recorder has a register 7 for line by line read-out. The pattern of charges cannot for example be transferred from subsidiary memory area 4 to subsidiary memory area 5 in one step until all the lines in subsidiary memory area 5 have been read out. The area of the CCD picture recorder 1 illustrated in FIG. 1 is subdivided into one subsidiary recording area 2 and three subsidiary memory areas 3, 4, and 5. The surface of the CCD picture recorder could in the simplest case also be divided into only three equally large areas, with only two subsidiary memory areas associated with a subsidiary recording area that takes up ⅓ of the total surface. It is of course also possible and reasonable to divide in other ways. Subsidiary recording area 2 could for instance be halved again to occupy ⅛ of the total surface and have seven downstream subsidiary memory areas. This division would provide a picture-repetition frequency four times as rapid at continuous operation.

FIG. 2 illustrates the previously known method of operating a CCD picture recorder. During one unit 8 of time a picture 9 is imaged on the recording area and then transferred to the memory area, allowing another picture 10 to be recorded in the recording area. This is followed by read-out of the memory area by register 7. As soon as the memory area is completely read out, the charges that represent second picture 10 are transferred from the recording area to the memory area, and the recording area will be ready for a third picture 11, which is transferred so that a fourth picture 12 can be recorded and similarly processed. It will accordingly be evident that two pictures can be processed during one unit 8 of time.

FIG. 3 illustrates the sequence over time of pictures in a CCD picture recorder 1 divided as illustrated in FIG. 1. The subdivision by halves in the recording and in the memory areas results in a doubling of the picture-repetition frequency, During one unit 8 of time, accordingly, four pictures 9, 10, 11, and 12 can be processed. A unit 8 of time is determined by the rate at which register 7 operates. When the recording area of CCD picture recorder 1 is divided into four subsidiary areas and the memory area likewise into four subsidiary areas the picture-repetition frequency can be increased fourfold.

FIG. 4 illustrates a discontinuous method of operation that is also possible with the CCD picture recorder 1 illustrated in FIG. 1. Pictures 9, 10, 11, and 12 can be recorded one after another in subsidiary recording area 2 in a very rapid sequence and their information content or corresponding charges transferred to subsidiary memory areas 3, 4, and 5 until the overall surface of CCD picture recorder 1 is completely charged. Pictures 9, 10, 11, and 12 are here compiled into a picture sequence 13 followed by an information gap 14. Pictures that occur or would occur during gap 14 cannot be stored with the CCD picture recorder illustrated in FIG. 1 because it is already full. Only once one unit 8 of time is over and the charge distribution four pictures has been read out can another four pictures be recorded and stored during a subsequent unit in rapid sequence, at the same picture-repetition frequency that is, with the whole process being repeated. This discontinuous operation necessarily involves information gaps 14, although the picture-repetition frequency can be very high. A different, finer that is, subdivision of CCD picture recorder 1 is of course also possible in order to increase the number of pictures inside one picture sequence 13.

FIG. 5 is a schematic wiring diagram of the essential elements of a device for carrying out the method. The start and length of picture sequence 13 and of the separate pictures 9, 10, 11, and 12 is established in an input station 15, and controls 17 activated through a line 16. Another line 18 leads from controls 17 to a reference pulse generator 19, and a third line to a variable pulse generator 21. Generators 19 and 21 are synchronized over lines 18 and 19. Downstream of generators 19 and 21 is an electronic switch 22 that communicates with CCD picture recorder 1 through a line 23. Another line 24 leads from reference pulse generator 19 to switch 22. The standard activating pulses for the frequency of reference pulse generator 19 can be initiated over line 24 and supplied to CCD picture recorder 1. Another line 25 is similarly provided to carry the modified activating pulses from variable pulse generator 21 as desired to CCD picture recorder 1 through switch 22. The circuitry of switch 22 is controlled by controls 17 through a line 26. It is also possible to control a mask 20 through a line 27 to cover CCD picture recorder 1. It is accordingly possible, depending on the application, to subdivide CCD picture recorder 1 in different ways to obtain different picture-repetition frequencies. The size of subsidiary recording area 2 will obviously change accordingly, always depending on the extent that the recording area of CCD picture recorder is masked or covered up to.

I claim:

1. Method of recording and storing pictures in rapid sequence comprising the steps of: imaging the pictures by an optical system on a recording surface of a CCD picture recorded operating on the frame-transfer principle; transferring the imaged pictures in form of charge pictures into a memory of the CCD picture recorder; reading out the pictures from said memory line-by-line by a register; dividing the surface of the CCD picture recorder into a recording area and a memory area; subdividing the surface of the CCD picture recorder into a smaller subsidiary recording area and at least two subsidiary memory areas; transferring one picture in separate steps from said subsidiary recording area through said subsidiary memory areas in sequence and imaging every subsequent picture in the subsidiary recording area as said subsequent picture becomes free; and transferring said subsequent picture in separate steps to a respective subsidiary memory area as said subsequent picture becomes free until all the subsidiary areas of the CCD picture recorder are completely charged.

2. A method of recording and storing pictures in rapid sequence comprising the steps of: imaging the pictures by an optical system on a recording surface of a CCD picture recorder operating on the frame-transfer principle; transferring the imaged pictures in form of charge pictures into a memory of the CCD picture recorder; reading out the pictures from said memory line-by-line by a register; dividing the surface of the CCD picture recorder into a recording area and a memory area; subdividing the surface of the CCD picture recorder into a smaller subsidiary recording area and at least one subsidiary memory area; transferring one picture in separate steps from said subsidiary recording area through said subsidiary memory area in sequence and imaging every subsequent picture in the subsidiary recording area as said subsequent picture becomes free; transferring said subsequent picture in separate steps to a respective subsidiary memory area as said subsequent picture becomes free until all the subsidiary areas of the CCD picture recorder are completely charged; and subdividing said memory area of said surface of the CCD picture recorder into at least two subsidiary memory areas.

3. A method as defined in claim 2, wherein the picture-repetition frequency is directly proportional to the subdivision of the recording area and the memory areas.

4. A method as defined in claim 3, wherein the series of pictures in one picture sequence is limited by the sum of the number of the subsidiary recording area and the subsidiary memory areas, said picture-repetition frequency being limited by said number of subsidiary areas.

5. An arrangement for recording and storing pictures in rapid sequence comprising: optical means for imaging the pictures on a recording surface of a CCD picture recorder operating on the frame-transfer principle; memory means of said CCD picture recorder for receiving the imaged pictures in form of charged pictures; register means for reading out the pictures from said memory means line-by-line; said surface of said CCD picture recorder being divided into a recording area and a memory area; said surface of said CCD picture recorder being subdivided into a smaller subsidiary recording area and at least two subsidiary memory areas; means for transferring one picture in separate steps from said subsidiary recording area through said subsidiary memory areas in sequence and imaging every subsequent picture in the subsidiary recording area as said subsequent picture becomes free; and means for transferring said subsequent picture in separate steps to a respective subsidiary memory area as said subsequent picture becomes free until all the subsidiary areas of the CCD picture recorder are completely charged; control means having a reference pulse generator; switch means and controls for determining the state of said switch means; a variable pulse generator being connectable to said reference pulse generator and to said CCD picture recorder through said switch means.

6. An arrangement as defined in claim 5, including input station means connected to said controls for determining the start and duration of the picture sequence or of the individual pictures.

* * * * *